United States Patent
Wiest et al.

(10) Patent No.: US 10,228,241 B2
(45) Date of Patent: Mar. 12, 2019

(54) DEVICE AND METHOD FOR DETECTING AN IMAGE OF A PREFERABLY STRUCTURED SURFACE OF AN OBJECT

(71) Applicant: INB VISION AG, Magdeburg (DE)

(72) Inventors: Hagen Wiest, Magdeburg (DE); Wolfram Schmidt, Stadt Falkenstein (DE); Robert Wagner, Neuburg am Inn (DE)

(73) Assignee: INB Vision AG, Magdeburg (DE)

( * ) Notice: Subject to any disclaimer, the term of this patent is extended or adjusted under 35 U.S.C. 154(b) by 0 days.

(21) Appl. No.: 15/743,211

(22) PCT Filed: May 12, 2016

(86) PCT No.: PCT/DE2016/200226
§ 371 (c)(1),
(2) Date: Jan. 9, 2018

(87) PCT Pub. No.: WO2017/005254
PCT Pub. Date: Jan. 12, 2017

(65) Prior Publication Data
US 2018/0202801 A1 Jul. 19, 2018

(30) Foreign Application Priority Data

Jul. 9, 2015 (DE) .................... 10 2015 212 843
May 10, 2016 (DE) .................... 10 2016 208 049

(51) Int. Cl.
*G01B 11/25* (2006.01)

(52) U.S. Cl.
CPC ...... *G01B 11/2527* (2013.01); *G01B 11/2513* (2013.01)

(58) Field of Classification Search
CPC .......... G02B 2027/0187; G02B 21/367; G02B 27/1026; G02B 27/1033; G02B 27/1046;
(Continued)

(56) References Cited

U.S. PATENT DOCUMENTS

| 4,802,759 A | 2/1989 | Matsumoto et al. |
| 2004/0046966 A1 | 3/2004 | Fujita |

(Continued)

FOREIGN PATENT DOCUMENTS

| DE | 10217068 | 5/2004 |
| DE | 112009001652 | 1/2012 |

(Continued)

*Primary Examiner* — Michael P Stafira
(74) *Attorney, Agent, or Firm* — Jason P. Mueller; Adams and Reese LLP

(57) ABSTRACT

The aim of the invention is a quick and very precise reconstruction of an object. This is achieved by a device and a method for detecting an image of a preferably structured surface of an object (6), comprising at least one pattern projection unit for illuminating the object (6) and at least one imaging unit (7) for capturing images of projected patterns. A temporal and/or spatial analysis of received images or image sequences is carried out in order to reconstruct the surface. The at least one pattern projection unit is designed to generate patterns using a diffraction of light on an optical grating. Furthermore, the method for detecting images is characterized in that by using the temporal and/or spatial analysis of the captured images or image sequences, corresponding pixels are ascertained by means of algorithms, said pixels together with an imaging function allowing a triangulation of surface points.

11 Claims, 1 Drawing Sheet

(58) Field of Classification Search
CPC ............... G02B 27/141; G02B 27/149; G02B 2027/0112; G02B 2027/0123; G02B 2027/0125; G02B 2027/013; G02B 2027/0138; G02B 2027/014
See application file for complete search history.

(56) References Cited

U.S. PATENT DOCUMENTS

| | | |
|---|---|---|
| 2004/0150836 A1 | 8/2004 | Kraus |
| 2005/0057810 A1 | 3/2005 | Goodwill |
| 2005/0237743 A1 | 10/2005 | Payne et al. |
| 2008/0165341 A1 | 7/2008 | Dillon et al. |
| 2009/0103103 A1 | 4/2009 | Berner |
| 2010/0110528 A1 | 5/2010 | Tang |
| 2013/0016362 A1 | 1/2013 | Gong et al. |

FOREIGN PATENT DOCUMENTS

| | | |
|---|---|---|
| DE | 112012002943 | 4/2014 |
| EP | 1944569 | 7/2008 |

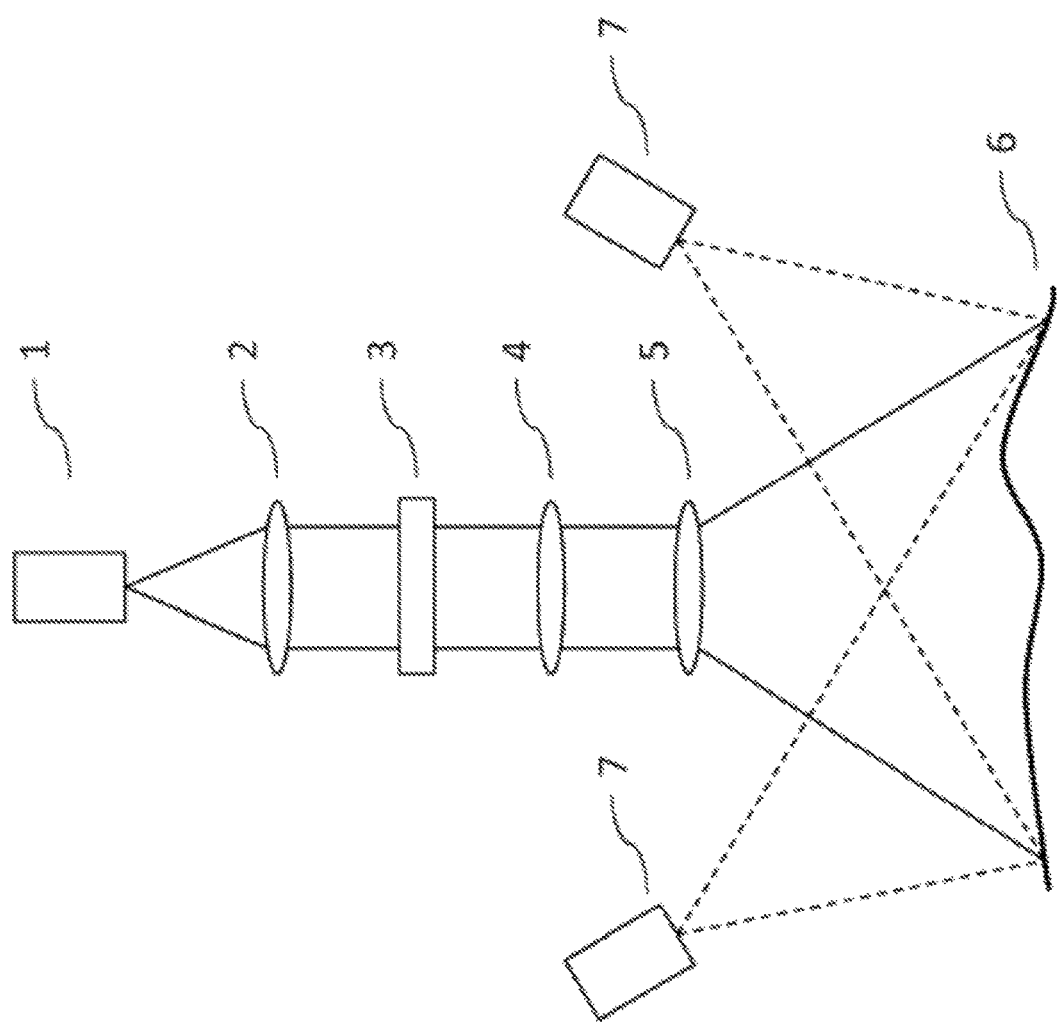

DEVICE AND METHOD FOR DETECTING AN IMAGE OF A PREFERABLY STRUCTURED SURFACE OF AN OBJECT

The invention relates to a device for detecting an image of a preferably structured surface of an object with at least one pattern projection unit for illuminating the object and at least one imaging unit for capturing images of projected patterns, wherein a temporal and/or spatial analysis of captured images or image sequences takes place in order to reconstruct the surface.

Furthermore, the invention relates to a method for detecting an image of a preferably structured surface of an object wherein the surface is illuminated by at least one pattern projection unit, wherein images of projected patterns are captured by at least one imaging unit and wherein a temporal and/or spatial analysis of captured images or image sequences takes place in order to reconstruct the surface.

Devices and methods of the initially cited type are known from practice and exist in different embodiments.

Basically, there are on the one hand different optical sensors or devices for the three-dimensional capture of a surface shape. In particular, sensors with active pattern projection play a central part here since height resolutions in the range of a few micrometers, μm are possible with these sensors. Typical and proven approaches are strip projection methods—deterministic pattern sequences—and the projection of statistic pattern sequences. These approaches are independent of whether a linear or a planar projection takes place.

Other approaches for optical 3-D sensors are based on runtime methods, e.g., photon mixing detectors (PMD sensors) in TimeOfFlight cameras or static pattern projection, e.g., Light Coding Technology from the PrimeSense company, projection of an artificial texture from the Ensenso company, which can supply partially very rapid 3-D data but have disadvantages regarding resolution and accuracy compared to 3-D the sensors with active pattern projection.

Optical sensors according to the principle of active pattern projection consist of one more pattern projection units and one more imaging units. The pattern projection unit, for its part, is composed of at least one light source, an appropriately adapted illumination lens, a light modulator, e.g., display, and the projection lens.

Current developments are, for example, a 3-D line sensor with structured illumination—University of Magdeburg/NB; DE 10 2013 212 409 A1—and 3-D sensors based on random pattern projection with laser speckle—University of Jena; DE 10 2012 002 161 A1.

The surface shape is calculated from the capture of the projected patterns using phase analysis methods or temporal correlation methods.

For achieving a high measuring accuracy and for the unambiguity of the measured result, pattern sequences of typically 4 to 10 individual patterns are necessary for a 3-D image, from which relatively long times for the image capture result. During this time no movement of the sensor relative to the surface may take place in the case of sensors with planar projection. In the case of sensors with linear projection the surface can be composed according to the movement of the sensor over the surface.

The times for the image capture in the optical sensors are on the one hand a function of the projection speed and the speed of the imaging units and on the other hand of the amount of light which can be brought via the pattern projection unit onto the object to be measured and which can be brought again in a usable manner into the imaging units. The sensitivity of the imaging units also plays a significant part here.

Whereas in the meantime relatively high imaging speeds can be realized in the imaging units—line cameras up to several hundred kHz, matrix cameras up to several hundred Hz —, the typically used projection units are limited to speeds of at the most 1900 Hz (DMD, Digital Micromirror Device). For binary pattern projection, e.g., DMDs from Texas Instruments do achieve an image repletion frequency of up to 32 kHz binary, see data sheet TI DLP7000-0.7 2×LVDS type-A DMD. However, since the projection of, e.g., sinusoidal strip patterns requires non-binary grey values, the achievable image change frequency is distinctly reduced by the pulse width modulation for the representation of an image which is then necessary.

The necessity for a high illumination intensity also limits the image capture speed of the optical sensor. LEDs can in principle be switched with high cycle rates; however, the imaging units used are mostly too insensitive to detect sufficient light for the capture of images given the illumination times which are then very short.

Pattern projection units with a laser-based light source have the tendency to project a distinctly greater amount of light. However, the amount of allowed light is technologically limited in particular in the case of image modulators for the strip projection based on LCD or LCoS since a significant amount of the introduced energy remains as power loss in the element. This adversely affects the correct function and can lead to destruction in the extreme case.

Image and/or light modulators which generate stochastic patterns, e.g., in the form of objective speckle from the laser-based light source do not have this problem in this form. However, tests have shown here that the principle-based, Gaussian distribution of the intensity over the measuring field as well as the distribution of the frequency of the brightness—few very bright spots and relatively many dark areas—negatively affect the quality of the measured results and supply poorer values in comparison to the projection of deterministic pattern sequences. Basically, a steady contrast of the entire measuring range can be achieved with deterministic pattern sequences. In the case of static methods even the contrast and therefore the measured result are subject to a location-dependent statistic.

Projectors which generate the necessary pattern sequences by mechanical changing of the pattern are very rapid. The changing of the patterns takes place, e.g., either by the rotation of a disk on which several static patterns are placed—MiniRot projector of the ABW company—or by a motor-driven deflection mirror—University of Jena, DE10 2011 121 696 A1. However, this type of projectors are either limited to the existing, static patterns—rotating, static patterns—or generate relatively similar static patterns—deflection mirrors—which render the correlation within the image sequences difficult.

Another group of light modulators or illumination systems is based on an LED array and the generation of the patterns by the projection lens, wherein the projection lens consists of lens arrays. Current work in this area is, for example, the LED-based multi-aperture pattern projection by Fraunhofer IOF Jena and a device developed by the University of Magdeburg for generating light patterns with the aid of cylindrical lenses, see DE 10 2013 002 399 A1. These illumination systems can also project patterns very rapidly since they depend only on the possible switching frequency of the LEDs; however, the projected patterns cannot be changed or changed only in narrow limits. Furthermore, only patterns achieved in a limited depth sharpness range can be generated and the patterns have in part a low contrast.

The known devices and methods for the image capture of a preferably structured surface of an object, in particular in the case of 3-D sensors, have the problem that up to the present there was still no appropriate device and still no appropriate method according to which a very rapid projection of any deterministic pattern sequences with an analog grey value representation within a pattern and a distinct change of the pattern contents from pattern to pattern, a supplying of high energy density in order to realize very short image capture times and a homogeneous distribution of brightness over the entire projection surface can be made possible.

The present invention therefore has the basic problem of making a device and a method for the capture of images of the previously cited type available according to which an object can be reconstructed, in particular in three dimensions, with great accuracy with simple constructive means.

According to the invention the above problem is solved on the one hand by a device with the features of claim 1. Accordingly, the device is characterized in that the at least one pattern projection unit is designed to capture patterns using a diffraction of light on an optical grating.

On the other hand, the above problem is solved by a method with the features of claim 10. Accordingly, the method is characterized in that by using the temporal and/or spatial analysis of the captured images or image sequences by algorithms, corresponding pixels can be determined which make possible in conjunction with an imaging function a triangulation of surface points.

It was at first recognized in a manner in accordance with the invention that the above problem is solved in a surprisingly simple manner by a skillful selection of the design of the at least one pattern projection unit. To this end the at least one pattern projection unit is designed in such a manner in accordance with the invention that it generates patterns using a diffraction of light on an optical grating. Grey value patterns can be generated very rapidly in this manner, from which on the whole a very rapid reconstruction of the object results with very high accuracy. As regards the method, corresponding pixels are determined by algorithms using the temporal and/or spatial analysis of the captured images or image sequences, wherein these determined pixels together with an imaging function make a triangulation of surface points possible.

As a result, an object can be reconstructed very rapidly and with great accuracy with constructively simple means, in particular in three dimensions, with the device according to the invention and the method in accordance with the invention for the capture of images of a preferably structured surface of an object.

As regards an especially accurate reconstruction of the surface, the reconstruction of the surface can be carried out with phase analysis methods and/or temporal correlation methods. Therefore, the surface shape can be readily calculated by triangulation given additional knowledge of the arrangement of the device. This can concern in another especially simple manner known phase analysis methods and/or temporal correlation methods.

As regards at least one pattern projection unit which is especially efficient and effective in practice, the pattern projection unit can comprise at least one MEMS light modulator. This light modulator modulates the light by diffraction on an optical grating.

In a concrete, advantageous embodiment the MEMS light modulator can comprise metallic strips and/or metallic plates which can be moved up and away or back-and-forth electrostatically. This movement of the metallic strips or metallic plates takes place in order to be able to position each pixel as desired between the grating function and the reflecting mirror.

Depending on the usage, a 0-order or $1^{st}$-order diffraction can be used in the framework of the at least one pattern projection unit. Care is to be taken here that the 0-order diffraction has a quite low contrast between "on" and "off" and that for using the $1^{st}$-order diffraction the imaging lens is to be designed more complexly than in an arrangement with a "0-order diffraction.

A settable analog grey value can be represented in an especially simple manner by applying an appropriate analog control voltage or appropriate analog control voltages, preferably per pixel. This can take place in a selected pattern projection unit by only one step, which results in advantages of speed compared to other systems.

In another advantageous manner the at least one pattern projection unit can have a construction designed for linear or one-dimensional projection. This allows, when being used, for example, in a line-based 3-D sensor a very high speed of the operation in comparison to other types of projection units. A display element can have only one line here. In order to capture planar structures, the continuous capture of a line in combination with a defined relative movement between the object measured and the sensor is used.

Different arrangements of 3-D sensors can be constructed based on the device according to the invention. A 3-D line sensor or a 3-D matrix sensor can be formed here. On the other hand, using the device according to the invention in deflectometry is very advantageous, wherein, conditioned by the method, no projection lens is used for the imaging on the object to be measured but rather, for example, a ground-glass disk or the like is required onto which the pattern projection unit can project the patterns.

In a concrete embodiment of the device according to the invention the at least one pattern projection unit can comprise a monochromatic light source, a white light source or a polychromatic light source. In the selection of the light source the particular usage is to be considered. In another advantageous manner the at least one pattern projection unit can comprise a lens for widening the generated light to a level and a width of a projection display. An inhomogeneity of the illumination arising from the widening can be corrected by an appropriate, pixelwise calibration of the projection display.

The present invention offers a combination of at least one pattern projection unit and at least one imaging unit with which the object can be measured three-dimensionally rapidly and without losses in the accuracy of the 3-D reconstruction in comparison to already known devices.

The device according to the invention and the method according to the invention make possible a very rapid projection of any deterministic pattern sequences with analog grey value representation within a pattern and a distinct change of the pattern contents from pattern to pattern, a supplying of a high energy density in order to realize very short image capture times and a homogeneous distribution of brightness over the entire projection surface.

According to a preferred exemplary embodiment a method and a device are made available for capturing the images of a preferably structured surface of an object using at least one imaging unit for capturing the surface, wherein the surface is illuminated in a structured manner by at least one pattern projection unit and wherein a temporal and/or spatial analysis of captured image sequences takes place for the reconstruction of the surface and wherein, using a temporal and/or spatial analysis of the individual images by algorithms, corresponding pixels are determined which make possible, together with the imaging function, a triangulation of surface points.

An imaging function mathematically represents an association of 3-D world coordinates to the coordinate system of the camera image or of the image of an imaging unit. In this manner it can be calculated for each 3-D coordinate or each point in space at which position this point is located in the camera image or in the image of an imaging unit. This association is determined in particular by the geometric dimensions of a camera sensor—magnitude and number of the pixels—as well as the characteristic values of the objective belonging to a camera—focal distance, distortion.

In another advantageous embodiment the at least one pattern projection unit generates the patterns using the diffraction of the light on an optical grating.

There are different possibilities of designing and further developing the teaching of the invention in an advantageous manner. To this end, reference is made on the one hand to the subordinate claims and on the other hand to the following explanation of a preferred exemplary embodiment of the invention using the drawing. In general, preferred embodiments and further developments of the teaching are also explained in conjunction with the explanation of the preferred exemplary embodiment of the invention. In the drawing the sole FIGURE shows in a schematic view an exemplary embodiment of the device according to the invention for the capture of images of a preferably structured surface of an object.

According to an exemplary embodiment of the present invention a 3-D measuring of objects takes place, wherein the exemplary embodiment comprises a combination of one or more imaging and pattern projection units, wherein the pattern projection unit or pattern projection units comprise MEMS-light modulators which modulate the light by diffraction on an optical grating, e.g., GLV—Grated Light Valve and PLV—Planar Light Valve of the Silicon Light Machine, CA company; WO 1996041217 A1, WO 2005059596 A2. Here, metallic strips or metallic plates are moved up and away electrostatically in order to be able to position as desired each pixel between a grating function and a reflecting mirror. Either the 0-order or the 1st-order diffraction is used, wherein the latter has a rather low contrast between On/Off and the imaging lens becomes more complex for the using of the 1st-order diffraction.

A certain analog grey value pattern can be represented with such a projection unit in one step by applying an appropriate analog control voltage, which represents a significant advantage of speed compared to DMDs, LCDs or LCoS, which can represent analog grey value patterns only with the aid of the temporal integration of successive pulse-width-modulated binary patterns. Furthermore, such a projection unit is also natively one-dimensional, i.e. designed for linear or one-dimensional projection in distinction to DMDs, LCDs or LCoS, which also allows a distinctly greater speed for the usage in a line-based 3-D sensor compared to conceivable solutions with the other cited technologies. The above-described projection unit is therefore the basis for a distinctly more rapid pattern projection and image capture than is currently possible with DMDs, LCDs or LCoS.

The above-described projection units were previously available one-dimensionally—two-dimensional prototypes are in development—and were previously exclusively concretely used in digital offset printing, in EUV lithography and for digital movie projection. In addition, such projection units are described as generally usable for methods of environment recognition—DE 10 2007 040 176 A1—and position tracking—US 20070268398 but only constitute a possible variant of several equivalent variants for these methods, in contrast to which this type of projection is essential here for the solution of the problem posed.

The use as projection unit for any deterministic, analog grey value patterns with a very high energy density in combination with one or more rapid and high-resolution imaging units in a sensor for 3-D measuring technology based on pattern sequences and temporal or local correlation methods is novel.

Optical sensors according to the principle of active pattern projection consist of one or more pattern projection units and one or more imaging units. The pattern projection unit is usually composed of at least one light source, an appropriately adapted illumination lens, a light modulator, e.g., a display, and the projection lens.

The surface shape is calculated by triangulation from the capture of the projected patterns by the imaging unit(s) using phase analysis methods or temporal correlation methods and the knowledge about the sensor arrangement.

In contrast to the previously known devices, a MEMS light modulator as described above is used as the pattern projection unit which modulates the light by diffraction on an optical grating.

Basically very different arrangements of 3-D sensors are advantageous with these projection units:

3-D line sensors with only one projection unit and only one camera up to two or more projection units arranged in a coplanar manner and with one or more cameras in a coplanar manner in order to achieve higher lateral resolutions or greater measuring fields are possible, cf. also WO 2014000738 A2.

3-D matrix sensors can be built up directly with one or several two-dimensional projection units and one or more matrix cameras. Furthermore, even the imaging of the one-dimensional projection unit can be broadened on a surface with the aid of special lenses, e.g. Powell lens, rod lens and the like.

The using of such a projection unit in deflectometry is also conceivable, wherein, conditioned by the method, no projection lens is used for the imaging onto the measured object but rather, e.g., a ground-glass disk or the like is necessary onto which the projection unit can project the pattern.

The sole FIGURE shows an exemplary embodiment in the form of a 3-D line sensor with a pattern projection unit and two cameras as imaging units.

A laser line with the width and the level of the active range of the projection display 3 is generated from a laser light source 1 with the aid of appropriate lenses 2 and the projection unit is illuminated with it. The projection unit modulates this laser line pixelwise, see above. The desired diffraction order is filtered via a Fourier lens 4 and the modulated laser line is projected via the projection lens 5 onto the object 6.

A certain number of images from the patterns projected onto the object is captured with two cameras 7 synchronized and calibrated with one another as imaging units.

The sequence from the image pairs is used for the three-dimensional reconstruction of the surface of the object. For the calculation of the surface shape the known algorithms for the 3-D reconstruction—phase correlation, time correlation—can be used, e.g. during the using of grey code patterns and/or sinusoidal patterns. Furthermore, pattern sequences with an optimized statistic can also be calculated and used for the measuring, for example, sinusoidal, triangular or other periodic patterns with phases and/or period lengths which vary line by line. For example, sequences of sinusoidal patterns with different phase position and different frequency can be used.

For the pattern projection a monochromatic light source in a spectral range of UV to NIR, e.g., laser in a GLV display as well as white or polychromatic light—in a PLV display— can be used. The customarily punctiform light source is ideally widened by a suitable lens to the height and width of the projection display. The inhomogeneity of the illumination produced by the widening can be corrected by an appropriate, pixelwise calibration of the projection display.

There is the possibility, by using a monochromatic light source, of suppressing disturbing foreign light influences with the aid of appropriate color filters in front of the imaging units. In order to avoid subjective speckle when using a monochromatic light source, various methods can be used, for example, a wavelength modulation of the laser (Chirp), use of broadband lasers, generation and mixing of a $2^{nd}$ polarization direction and an imaging via a diffusor.

As regards other advantageous embodiments of the device according to the invention and of the method according to the invention, reference is made to the general part of the specification and to the attached claims in order to avoid repetitions.

Finally, it is specifically pointed out that the previously described exemplary embodiment of the teaching of the invention serves only to explain the claimed teaching but is not limited to the exemplary embodiment.

LIST OF REFERENCE NUMERALS 1 light source
2 lens
3 projection display
4 Fourier lens
5 projection lens
6 object
7 camera, imaging unit

The invention claimed is:

1. A device for detecting an image of a surface of an object comprising:
   at least one pattern projection unit having an optical grating and configured to illuminate the object; and
   at least one imaging unit configured to capture images of a projected pattern,
   wherein the device performs at least one of a temporal and spatial analysis of a captured image in order to reconstruct the surface,
   wherein the at least one pattern projection unit is configured to generate patterns using a diffraction of light on the optical grating, and
   wherein an analog grey value is set in the at least one pattern projection unit by applying an analog control voltage.

2. The device according to claim 1, wherein the reconstruction of the surface is carried out by at least one of a phase analysis method and a temporal correlation method.

3. The device according to claim 1, wherein the at least one pattern projection unit includes at least one MEMS (Micro-Electromechanical System) light modulator.

4. The device according to claim 3, wherein the MEMS light modulator includes at least one of metallic strips and metallic plates which can be moved up and away or back-and-forth electrostatically.

5. The device according to claim 1, wherein a 0-order or $1^{st}$-order diffraction is used.

6. The device according to claim 1, wherein the at least one pattern projection unit is configured for linear or one-dimensional projection.

7. The device according to claim 1, wherein the device forms a 3-D line sensor or a 3-D matrix sensor or is used in deflectometry.

8. The device according to claim 1, wherein the at least one pattern projection unit includes a monochromatic light source, a white light source, or a polychromatic light source, and wherein the at least one pattern projection unit preferably includes a lens for widening the generated light to a level and a width of a projection display.

9. A method comprising:
   capturing the images of a surface of an object with a device,
   wherein the surface is illuminated by at least one pattern projection unit that is configured to generate patterns using a diffraction of light on an optical grating,
   wherein images of projected patterns are captured by at least one imaging unit,
   wherein the device performs at least one of a temporal and spatial analysis of a captured image for the reconstruction of the surface to determine corresponding pixels by algorithms which, in conjunction with an imaging function, permits a triangulation of surface points, and
   wherein an analog grey value is set in the at least one pattern projection unit by applying an analog control voltage.

10. The device according to claim 1, wherein the analog control voltage is applied per pixel.

11. The method according to claim 9, wherein the analog control voltage is applied per pixel.

* * * * *